United States Patent

[11] 3,602,491

[72] Inventor Heimo Leopold
 Dusseldorf, Germany
[21] Appl. No. 777,576
[22] Filed Nov. 21, 1968
[45] Patented Aug. 31, 1971
[73] Assignee Maerz Ofenbau GmbH
 Dusseldorf, Germany
[32] Priority Nov. 22, 1967
[33] Germany
[31] P 15 83 271.0

[54] SCRAP-MELTING, STEELMAKING VESSEL
 2 Claims, 6 Drawing Figs.
[52] U.S. Cl. .................................................. 266/33,
 266/34, 74/43
[51] Int. Cl. ........................................ C21b 11/00
[50] Field of Search ........................................ 266/33, 34;
 75/43, 34 V, 34

[56] References Cited
UNITED STATES PATENTS

| | | | |
|---|---|---|---|
| 2,768,075 | 10/1956 | Sterental ...................... | 266/33 |
| 2,776,883 | 1/1957 | Marshall et al. ............... | 266/33 X |
| 2,828,201 | 3/1958 | Findlay ........................ | 266/33 X |
| 2,970,829 | 2/1961 | Reynders ...................... | 266/33 UX |

Primary Examiner—Donald R. Schran
Attorney—Kelman and Berman

ABSTRACT: The specification describes a method for producing steel utilizing scrap. A vessel suitable for use as a top-blown converter or an electric furnace is charged with scrap which is preheated in it and the vessel is then used for making steel. After this the vessel is again charged with scrap and the procedure is repeated.

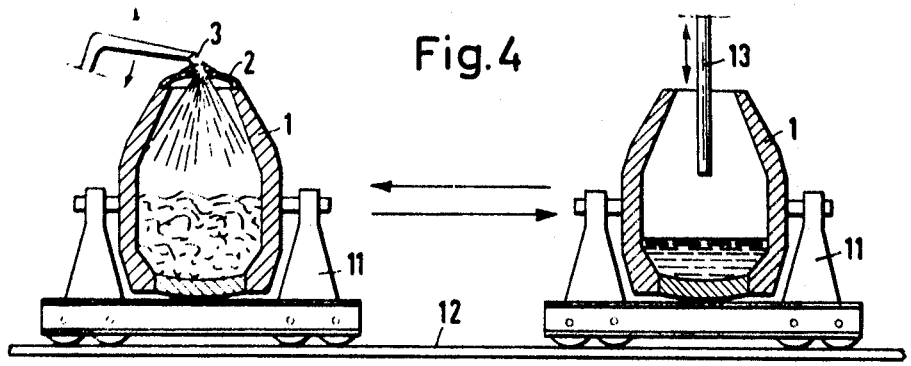
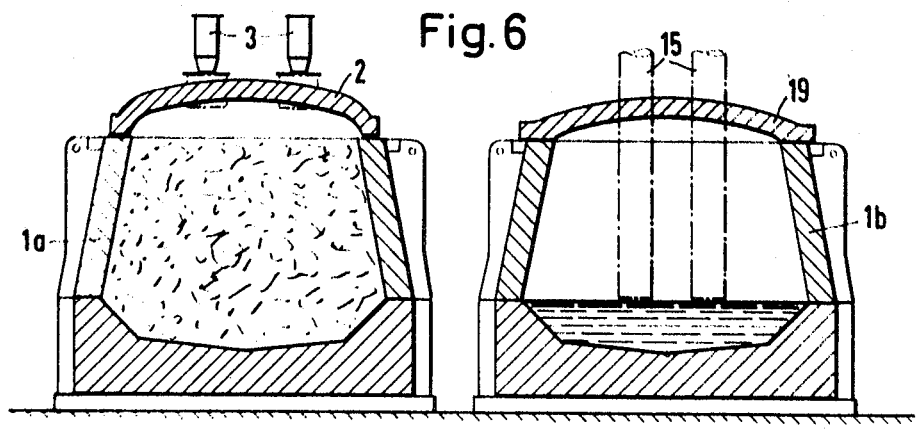
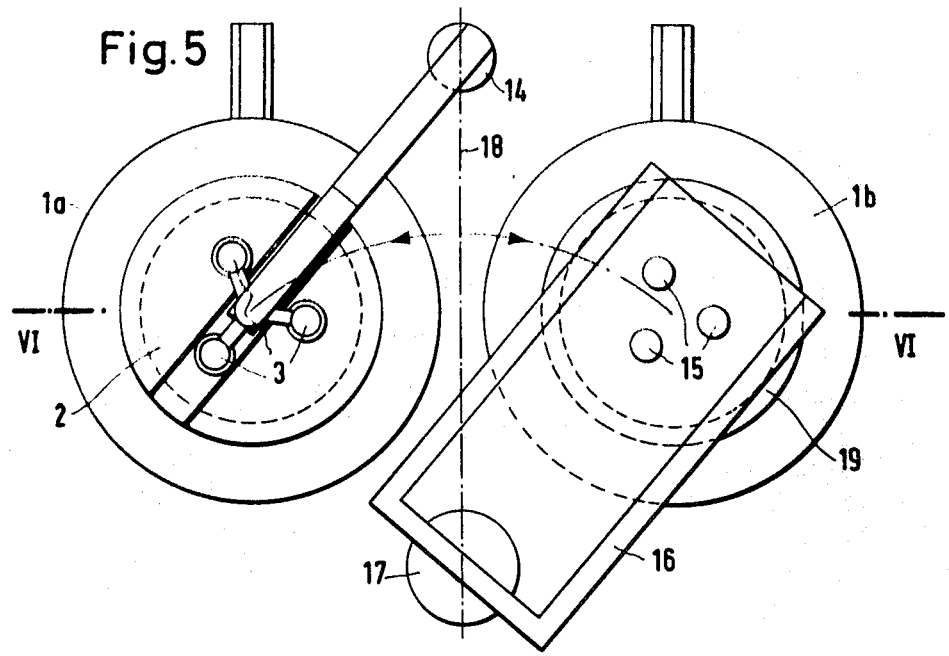

SCRAP-MELTING, STEELMAKING VESSEL

The invention relates to steel production and more particularly to electric furnace and top-blown converter steelmaking processes utilizing scrap. Scrap has certain economic advantages over pig iron owing to its low price.

The amount of heat energy for producing liquid raw steel from steel scrap amounts to about 380 kcal./kg. The overall energy requirement, that is to say the requirement taking efficiency into account, for electric furnaces is about 550 kwh./t. For the heating of steel scrap to about 1,000° C. about half the amount of energy necessary for steel production is required. The use of relatively expensive electric power is uneconomic in comparison with the costs to be expected if fuels such as oil or natural gas are used for heating up.

In order to reduce costs and increase output the use of cheap fuels for preheating scrap has been repeatedly proposed for use in connection with various steelmaking methods. Thus, in "Stahl und Eisen" 1967, pages 897 to 903 the use of oil-oxygen burners is described. This method was, however, not economically successful owing to the high cost of commercial quality oxygen. A further factor was that despite the use of a high flame temperature the amount of the heat utilized was not more than 50 percent owing to insufficient conduction into the mass of scrap. A better method is that described in the German specification 1,216,901 in which the scrap is preheated from above in charging containers of basketlike construction, the products of combustion being drawn down through the scrap. After preheating the scrap was placed in an electric furnace. However, with this method about one-third of the quantity of heat is lost from the scrap.

In oxygen-blown converter processes the scrap makes up about 25 percent of the charge, the amount being limited by the amount of heat contained in the liquid iron and the amount of heat that can be released from it by chemical reaction. Any increase in the proportion of scrap, which would be economically advantageous, would require the supply of additional energy. Up till now it has been found that heating scrap as part of a charge in a converter vessel using oxygen-fuel burners is expensive as regards energy owing to the poor transfer of heat to the scrap.

The obvious idea of preheating the scrap before placing it in a converter is found to be impracticable owing to the elaborate equipment required and the amount of manipulation necessary to bring the hot scrap into the converter.

One object of the present invention is to provide a method, which can be used both with electric furnaces and with converters or other steelmaking apparatus employing a cruciblelike vessel, in which the scrap is heated to a high temperature, for example 1,000° C., using cheap fuels and without the necessity of employing commercial quality oxygen. A further object of the invention is to provide such a process in which heated scrap does not have to be transferred to another vessel.

The present invention consists in a method for producing steel in a cruciblelike vessel comprising repeatedly carrying out the following two-stage procedure:
1. preheating scrap in the vessel by means of a burner whose products of combustion are drawn through the scrap by suction, and
2. carrying out steelmaking in the vessel. In accordance with a preferred form of the invention two vessels are used together to carry out the stages of the method alternately so that parts of the equipment necessary such as electrodes (if the steel is to be made electrically), the pneumatic blowing arrangement (in the case of a converter steelmaking process) and the preheating station can be used optimally. The vessel can be arranged to be moved from the preheating station to the electrode or pneumatic refining station or in the case of a stationary vessel the electrodes or pneumatic refining means and the preheating means can be arranged to be moved.

Although, as inferred above, the important object of the invention is to make the use of oxygen unnecessary, there may be circumstances, such as economic circumstances, which make it advantageous to use oxygen.

Cheap fluid fuels such as heating oil and natural gas are burned with cold or preheated air or oxygen-enriched air and the flames, or gases of combustion, are drawn down through the material to be melted. In the case of cruciblelike vessel suitable drawoff openings can be provided. It is not possible to provide for sufficient drawoff through the bottom of such a vessel.

The invention is now described with reference to the accompanying drawings.

FIG. 4 shows a top-blown converter process making use of the method in accordance with the invention.

FIG. 5 is a plan view of an electric steelmaking installation in accordance with the invention.

FIG. 6 is a side view and section of the installation in accordance with FIG. 5.

Figure 1:
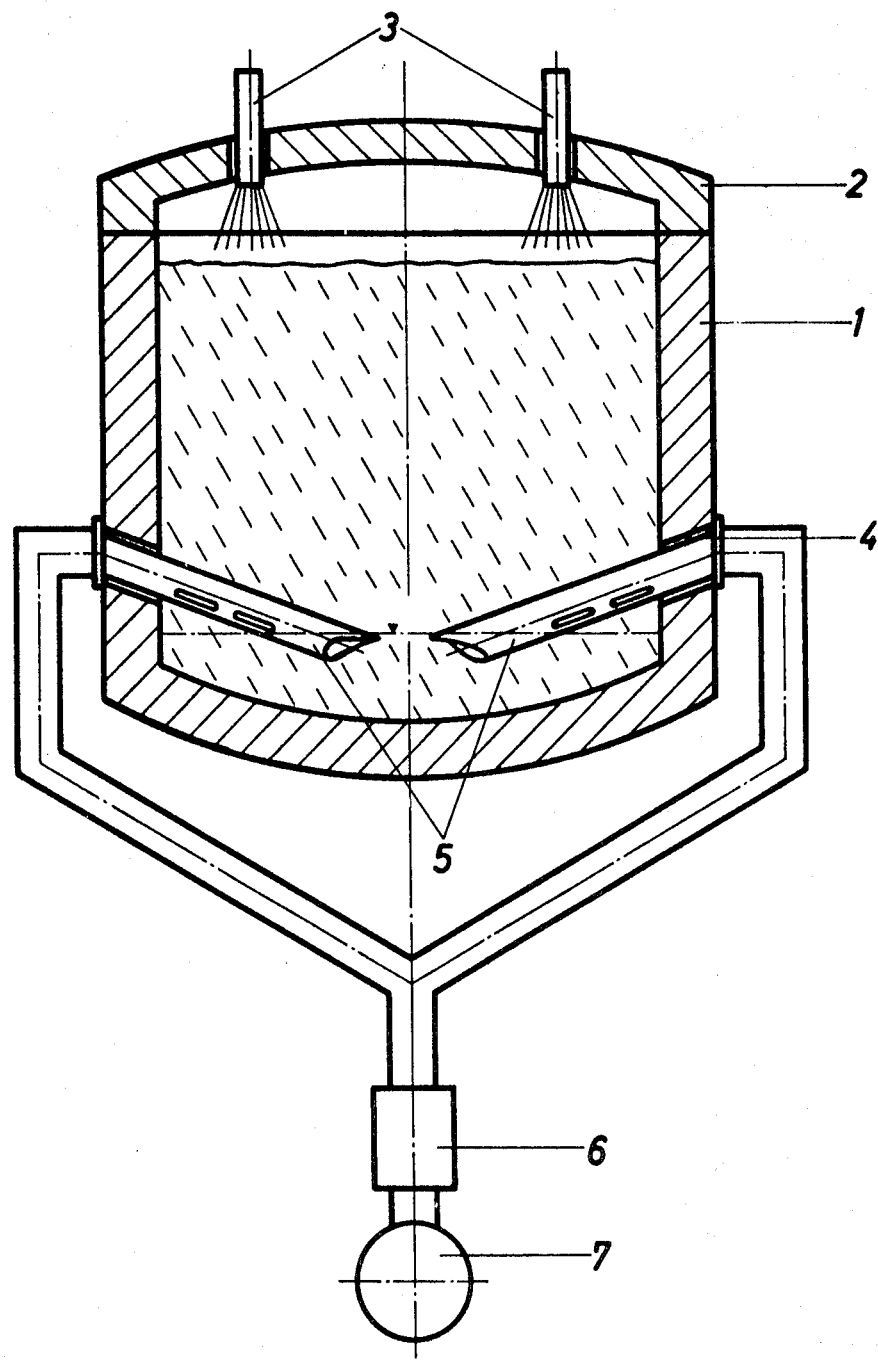
FIG. 1 is an axial section of a vessel with downwardly projecting burners and radially extending tubes near the bottom of the vessel for drawing off products of combustion.

As shown in FIG. 1 a crucible-shaped preheating and steelmaking vessel 1 in accordance with the invention is provided with a lid 2 used only during scrap heating. Burners 3 project down through holes in the lid. In the sidewalls of the vessel there are suction openings 4 slightly above the level which will be assumed by the charge when it melts. In order to enhance the heating action of the products of combustion from the burners 3, tubes 5 extend radially inwards through the openings 4 and slope downwards. The tubes 5 are provided with openings in their walls. The tubes 5 are connected with a suction means 6 which conveys the products of combustion to a chimney 7.

Figure 2:
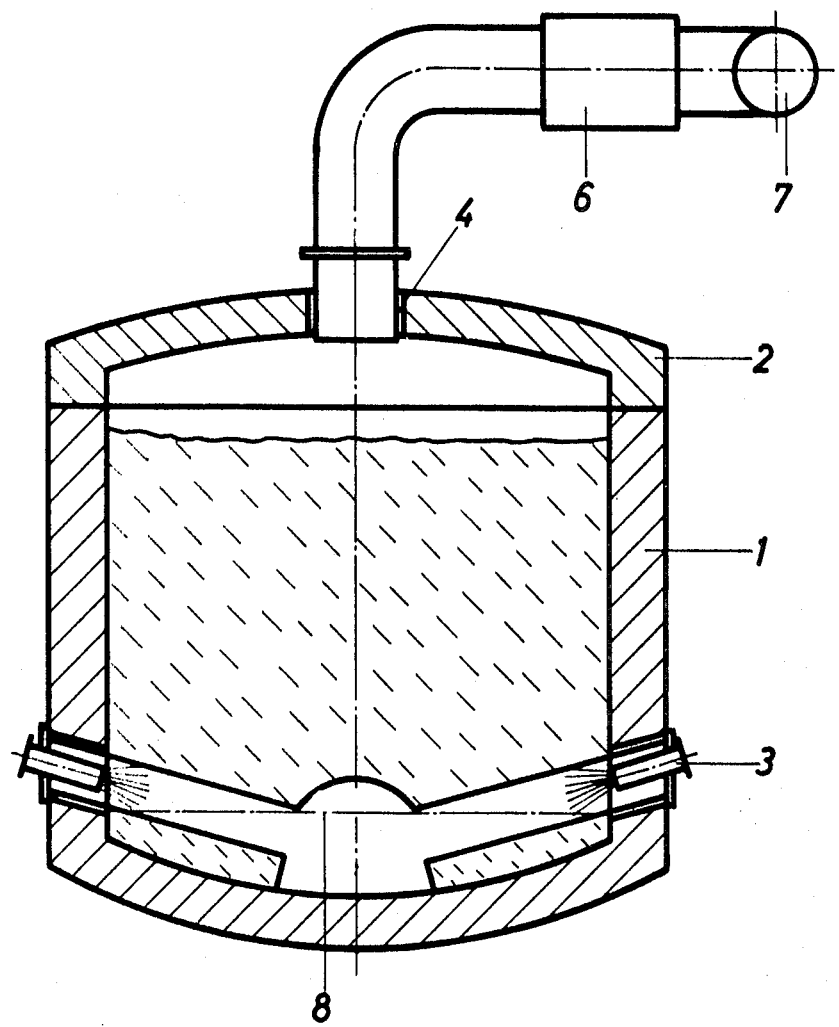
FIG. 2 is a further axial section of a vessel for carrying out the invention in which exhaustion takes place through the lid of the vessel.

In the embodiment of the invention shown in FIG. 2 the products of combustion are drawn upwardly through the charge of the vessel 1 since the burners 3 are arranged to operate through openings at the bottoms of the sidewalls, while suction is applied through a duct to an opening 4 in the center of the lid 2. Preferably the scrap charge is pressed in the vessel so as to leave empty space 8 for the flames from the burners. The level which is assumed by the molten scrap in the vessel 1 is denoted by a horizontal dot-dash line.

Figure 3:
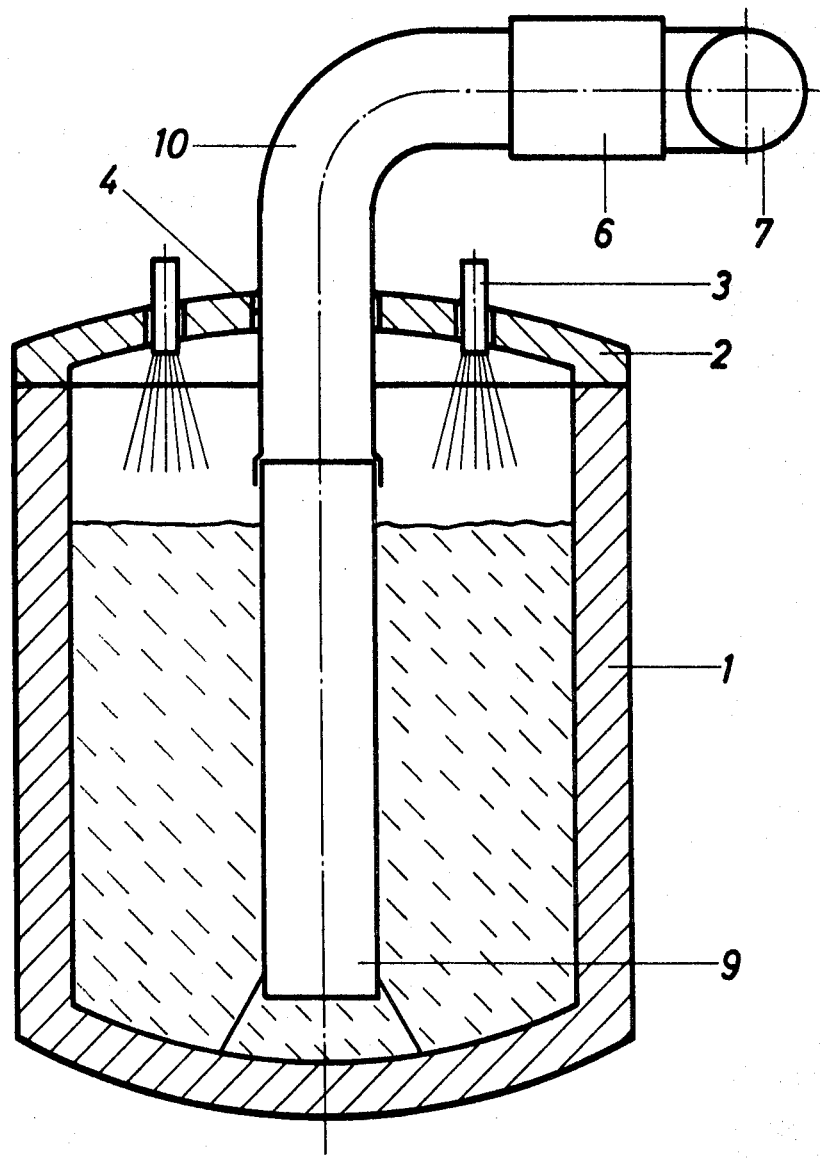
FIG. 3 shows a still further vessel for carrying out the invention in which exhaustion takes place by means of a tube extending down from the top of the vessel to a position near the bottom of the charge.

In converters for the pneumatic refining of the charge to produce steel, the burners and the suction tube are conveniently introduced from above instead of through the sidewalls of the converter vessel. As shown in FIG. 3 the burners 3 are arranged in holes in the lid 2. A suction tube 9 extends downwards and is connected by means of an elbow 10 to a suction means 6. The suction tube 9 is left in position after heating the scrap and is melted with it.

After heating of the scrap in the embodiment of the invention shown in FIGS. 1, 2 and 3, molten pig iron is brought into the vessel 1 and refining is carried out electrically or by means of a hot blowing lance.

FIG. 4 shows the arrangement of a steelmaking vessel 1 on a bogie 11 running on rails 12. The vessel 1 in the left-hand side of FIG. 4 has the removable lid 2 used for preheating placed on it. A burner 3 projects its flame down into the vessel to preheat a charge of 80 tons of scrap in it. The volume occupied by the scrap is 80 cubic meters. Suction tubes for drawing the products of combustion down into the scrap are used but not shown in the drawing. Heating is carried out so as to reach a temperature of 900° C. After heating the converter vessel 1 and bogie 11 are moved into the position shown in the right-hand side of FIG. 4, this being the top-blowing station. Molten iron is placed in the vessel and top-blowing is carried out with a vertically movable tubular lance 13 using oxygen.

FIG. 5 is a plan view showing two steelmaking vessels 1a and 1b. Reference numeral 14 denotes a column carrying an arm with burners 3 for preheating scrap in the vessels. The burners can be swung from vessel 1a to vessel 1b. Reference numeral 15 denotes electrodes for electric steelmaking on an arm 16 which is pivoted on a column 17. The vertical pivot axes of the electrodes 15 and the burners 3 are spaced from each other on a line 18 equidistant from the centers of the two steelmaking vessels. Suction tubes in the converter are used but not shown.

FIG. 6 is a vertical section on the line VI—VI of FIG. 5, the means for pivotal mounting of the electrodes 15 and the burners 3 being omitted.

The invention is further illustrated by the following example.

EXAMPLE

Use was made of two electric furnace vessels each having a capacity of 60 tons.

The time schedule of production in accordance with the example is as follows:

| Pre-heating in vessel in heating station, min. | | Vessel in electrode station for steel-making, min. | |
| --- | --- | --- | --- |
| Working step: | | | |
| Preparation of vessel | 15 | Changing lids | 10 |
| Charging | 15 | Steel-making and finishing | 80 |
| Putting lid in position | 5 | Tapping | 5 |
| Pre-heating | 60 | | |
| Total time | 95 | | 95 |

The amount of scrap used is 66 tons. Fuel consumption for preheating this amount of scrap to a mean temperature of 850° C. in 1 hour amounts to $0.2 \times 10^6$ kcal./t.

For this procedure the economy in current is about 180 kwh./t. There is also a reduction in electrode consumption. This consumption is high in conventional electric furnace operation and amounts to about 2 kg./t. steel.

The time in which the transformer installation is actually in use is doubled since operations which do not require the use of electrodes can be largely carried out on the left-hand vessel.

Converters operated conventionally, that is without preheating, can use 250 kg. of scrap per ton of steel produced. Preheating of the scrap to 900° C. makes it possible to increase the amount of scrap to 400 kg. per ton. The fuel consumption for preheating is $0.25 \times 10^6$ kcal./t. scrap. Heating the scrap in vessels which are moved from one station to the other or are kept stationary and used with swinging heating and blowing means brings with it cost advantages over methods using less scrap and more liquid iron, and the time required for scrap preheating does not reduce the output.

What I claim is:
1. In a steelmaking apparatus, in combination:
   a. a crucible-shaped vessel having an open top and a bottom wall opposite said top;
   b. a lid removably arranged on said vessel and covering said top, said lid being formed with a burner opening;
   c. a burner mounted at said opening, said burner being capable of burning a fluid fuel and positioned for injecting the gases of combustion formed by said burning into said vessel; and
   d. suction means for withdrawing said gases from said vessel, said suction means including a conduit extending inward of said vessel through an opening in the same remote from said top and having an orifice open to the interior of said vessel adjacent said bottom wall and remote from said top.
2. In an apparatus as set forth in claim 1, said conduit sloping downward from said opening toward said bottom wall and having an orifice remote from said opening.